US008986087B2

(12) United States Patent
Choi et al.

(10) Patent No.: US 8,986,087 B2
(45) Date of Patent: Mar. 24, 2015

(54) STRUCTURE FOR PROTECTING RADIO FREQUENCY REMOTE HEAD

(75) Inventors: Ji-Hyeon Choi, Suwon-si (KR); Seong-Yong Park, Seongnam-si (KR); Han-Seok Kim, Seoul (KR); Jun-Sung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 567 days.

(21) Appl. No.: 13/500,415

(22) PCT Filed: Oct. 6, 2010

(86) PCT No.: PCT/KR2010/006828
§ 371 (c)(1),
(2), (4) Date: Apr. 5, 2012

(87) PCT Pub. No.: WO2011/043589
PCT Pub. Date: Apr. 14, 2011

(65) Prior Publication Data
US 2012/0196522 A1      Aug. 2, 2012

(30) Foreign Application Priority Data

Oct. 6, 2009   (KR) .................. 10-2009-0094693

(51) Int. Cl.
*H05K 5/00*       (2006.01)
*H04B 1/03*       (2006.01)
(52) U.S. Cl.
CPC ....................................... *H04B 1/03* (2013.01)
USPC ........................... 454/184; 454/237; 454/370

(58) Field of Classification Search
CPC ..... H04B 1/03; H04B 1/036; H04B 2001/3894
USPC ................. 454/3, 41, 48, 184, 237, 370, 900; 165/48.2
See application file for complete search history.

(56) References Cited

U.S. PATENT DOCUMENTS 5,273,062 A * 12/1993 Mozdzanowski ............... 135/16
2007/0171888 A1   7/2007 Adams

OTHER PUBLICATIONS

S. Arms et al., Power Management for Energy Harvesting Wireless Sensors, MicroStarin, Inc., SPIE Int's Symposium on Smart Structures & Smart Materials, Mar. 9, 2005, San Diego CA.
J. Louhi, Energy Efficiency of Modern Cellular Base Stations, Nokia Siemens Networks, IEEE, Oct. 4, 2007.

* cited by examiner

*Primary Examiner* — Gregory Huson
*Assistant Examiner* — Dana Tighe
(74) *Attorney, Agent, or Firm* — Jefferson IP Law, LLP

(57) ABSTRACT

A structure is provided for protecting a Radio Frequency Remote Head (RRH). The structure includes a solar head and a solar body. An upper side of the solar head is sloped to prevent an inflow of rainwater and has at least one solar panel, and a lower side thereof has at least one round cable hole surrounded by a rubber material. The solar body is situated on a lower end of the solar head and includes a plurality of solar panels, a side of each of which is sloped to prevent an inflow of rainwater and is openable upward. An upper end of the solar body has an air outlet formed to exhaust air, and a lower end thereof has an air inlet formed to receive air. The air outlet and the air inlet each have a plurality of supports arranged at specific intervals and connected by a protection net.

13 Claims, 4 Drawing Sheets

STRUCTURE FOR PROTECTING RADIO FREQUENCY REMOTE HEAD

PRIORITY

This application is a National Stage application under 35 U.S.C. §371 of an International application filed on Oct. 6, 2010 and assigned application No. PCT/KR2010/006828, and claims the benefit under 35 U.S.C. §365(b) of a Korean patent application filed Oct. 6, 2009 in the Korean Intellectual Property Office and assigned application No. 10-2009-0094693, the entire disclosure of which is hereby incorporated by reference.

BACKGROUND OF THE INVENTION

1. Field of the Invention

The present invention relates to a mobile communication system. More particularly, the present invention relates to a structure for protecting a Radio Frequency Remote Head (RRH) in a mobile communication system.

2. Description of the Related Art

In a mobile communication system, a Radio Frequency Remote Head (RRH) is a digital repeater system, and includes an antenna, a Digital-to-Analog (D/A) converter, an up-converter, a duplexer, a down-converter, an Automatic Gain Controller (AGC), and an Analog-to-Digital (A/D) converter. The RRH is commonly installed outside a building. As a result, the RRH should be protected from various surroundings (for example, direct sunlight, rain, wind, thunderbolt, etc.) to prevent a possible error from occurring when the RRH is connected to other structures and to improve the stability and life of the entire RRH.

FIGS. 1A-1C are diagrams showing the conventional RRH protection structures according to the related art.

Referring to FIGS. 1A-1C, to protect RRH(s), a protection cover & integrated fan, a heat sink, and a solar panel are used. The protection cover & integrated fan in FIG. 1A surrounds an exterior of a protection cover of each RRH to protect the RRH from direct sunlight. For example, when a fan is mounted on an upper end of the RRH, a temperature of the RRH may increase from 45° C. to 55° C. The fan is powered by the RRH.

The heat sink in FIG. 1B is designed to be mounted on a surface of the RRH, improving the effect of the existing natural air convection cooling.

The solar panel in FIG. 1C is installed to collect solar energy. The collected solar energy is used as power for various purposes (for example, for lighting, communication, environmental sensing, etc.).

However, when the RRH is protected with the protection cover & integrated fan of FIG. 1A, the internal heat may not be discharged smoothly. If an integrated fan is mounted on an upper end thereof to exhaust the internal air, a fan controller for the integrated fan should be additionally installed, causing the need for separate maintenance. The heat sink of FIG. 1B, provided to improve the effect of the existing natural air convection cooling, improves the natural air convection cooling effect by widening the surface being in contact with the external air, which, however, increases the surface area exposed to the sunlight. Like the solar panel of FIG. 1C, the heat sink of FIG. 1B is continuously exposed to the sunlight during the daytime, increasing the internal temperature of the RRH. The internal temperature of the RRH decreases during the nighttime. In case of rain, connection ports on a lower end of the RRH are directly exposed to the external environment, and if the exposure is repeated for a long time, the connection ports may be rusted or an error may occur in making a connection to other external devices. The periodic and continuous change in the temperature of the RRH and the direct exposure to the external environment increase occurrence of functional errors of the RRH and degrade the durability thereof, causing a reduction in the stability and life of the entre RRH.

Accordingly, an RRH protection structure is needed to protect an RRH for a mobile communication system from various surroundings to prevent a possible error from occurring when it is connected to other structures and to improve the stability and life of the entire RRH.

SUMMARY OF THE INVENTION

Aspects of the present invention are to address at least the above-mentioned problems and/or disadvantages and to provide at least the advantages described below. Accordingly, an aspect of the present invention is to provide an RRH protection structure for protecting an RRH for a mobile communication system from various surroundings to prevent occurrence of an error when connected to other structures.

Another aspect of the present invention is to provide an RRH protection structure capable of improving the stability and life of the entire RRH for a mobile communication system.

In accordance with an aspect of the present invention, a structure for protecting a Radio Frequency Remote Head (RRH) in a mobile communication system is provided. The RRH protection structure includes a solar head and a solar body. An upper side of the solar head is sloped to prevent an inflow of rainwater and has at least one solar panel, and a lower side thereof has at least one round cable hole surrounded by a rubber material. The solar body is situated on a lower end of the solar head and includes a plurality of solar panels, a side of each of which is sloped to prevent an inflow of rainwater and is openable upward. An upper end of the solar body has an air outlet formed to exhaust the air, and a lower end thereof has an air inlet formed to receive the air. Each of the air outlet and the air inlet has a plurality of supports arranged at specific intervals and connected by a protection net.

As is apparent from the foregoing descriptions, exemplary embodiments of the present invention may protect RRHs for a mobile communication system from various surroundings to prevent a possible error from occurring when the RRHs are connected to other structures, thereby improving the stability and life of the entire RRHs.

In addition, exemplary embodiments of the present invention may improve the cooling effect for the RRHs by simultaneously blocking solar energy and utilizing the solar energy to generate solar power (an example of eco-friendly renewable energy), and if the capacities of solar panels and battery cells are increased in the future, exemplary embodiments of the present invention may build a Base Station (BS) power system employing an off-grid scheme that does not use commercial power, gaining competitiveness in eco-friendly BS development.

In addition, exemplary embodiments of the present invention enable mounting of an LED device or a lighting device on the exterior surface of the RRH protection structure, and may achieve lighting and advertising effects, providing stylish appearances.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention are directed to an RRH protection structure including a head part and a body part, designed to protect an RRH for a mobile communication system from various surroundings to prevent a possible error from occurring when the RRH is connected to other structures and to improve the stability and life of the entire RRH.

Figure 1A:
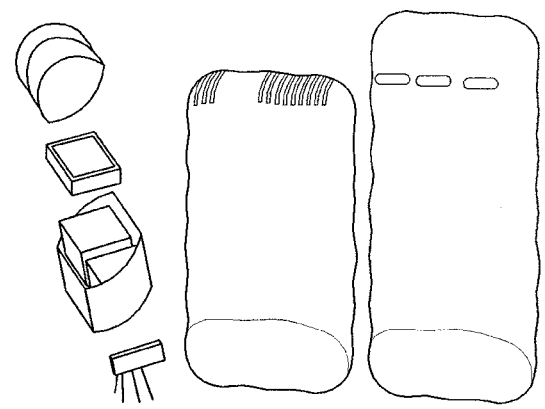
FIGS. 1A-1C are diagrams showing the conventional RRH protection structures according to the related art.
Figure 1B:
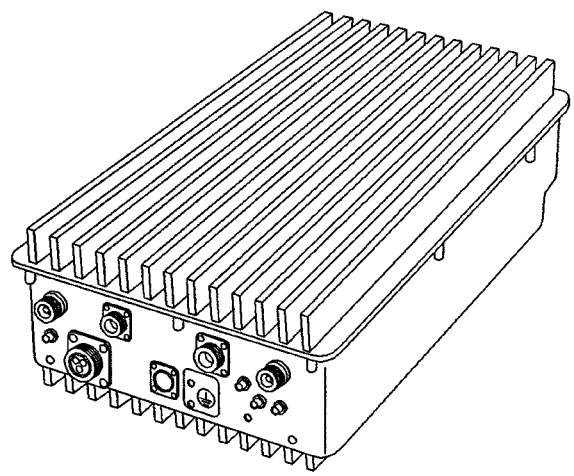
Figure 1C:
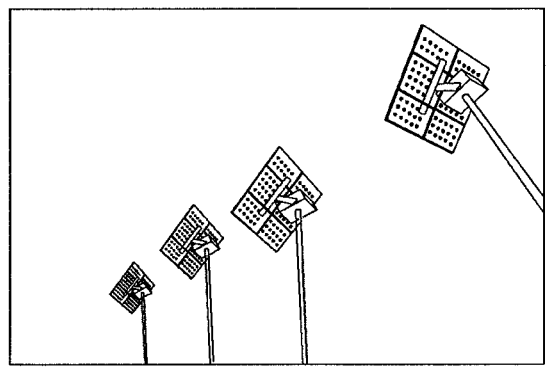
Figure 2:
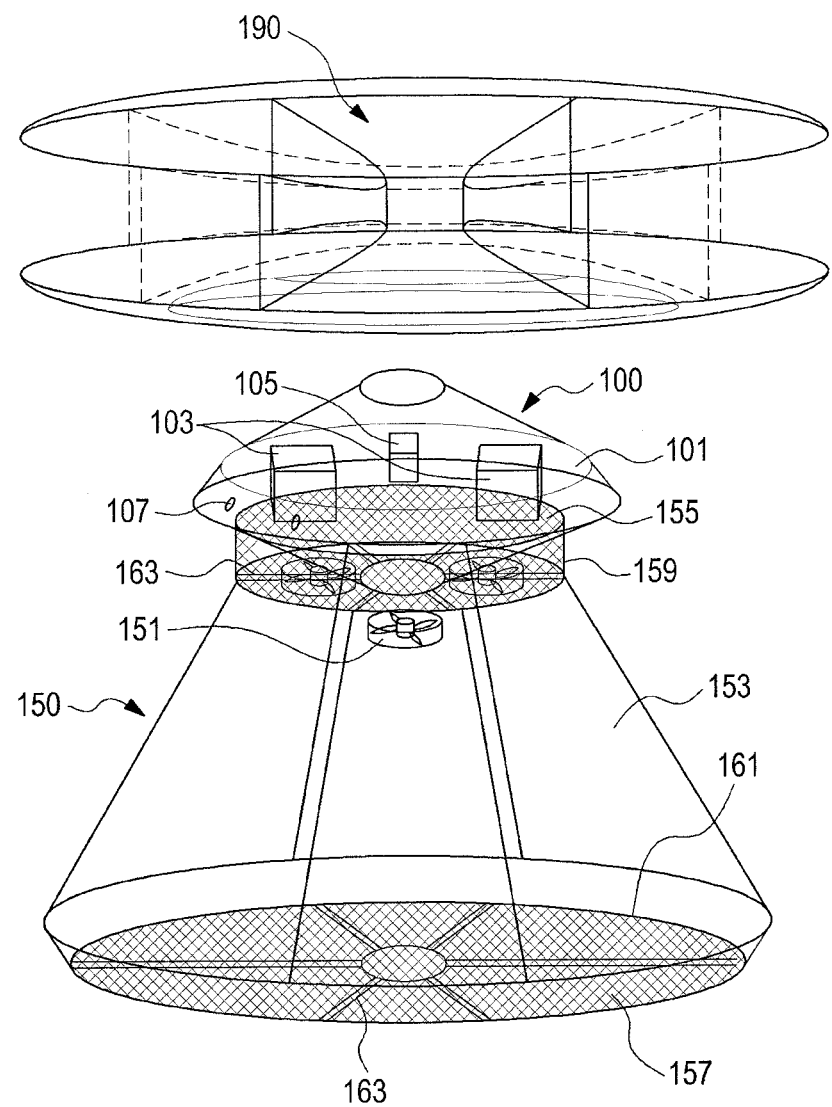
FIG. 2 is a diagram showing an RRH protection structure according to an exemplary embodiment of the present invention.

FIG. 2 shows an RRH protection structure according to an exemplary embodiment of the present invention.

Referring to FIG. 2, the RRH protection structure is divided into a solar head 100 (or a head part) and a solar body 150 (or a body part), and may further include a wind cap 190.

The solar head 100 is situated on an upper end of the solar body 150 to block the direct inflow of rainwater into the interior of the solar body 150. The solar head 100 is shaped in the form of a truncated circular cone with a flat top, and its side is divided into an upper side and a lower side. A central part of the solar head 100 is bored in a cylindrical shape having the same diameter as that of a pole (not shown) so that the solar head 100 may be mounted on the pole. The upper side of the solar head 100 has at least one solar panel 101, and the lower side thereof has a round cable hole 107 surrounded by a rubber material. The cable hole 107 is formed to block an inflow of rainwater into the interior of the solar body 150 along a communication cable and to enhance the appearance of the RRH protection structure. In the solar head 100 are mounted storage cells 103 (for example, secondary cells) for storing electric energy provided from solar panels 101 and 153, and a fan controller 105 for sensing a temperature in the solar body 150 and adjusting, according to the sensed temperature, a Revolutions Per Minute (RPM) of fans 151 formed in the solar body 150. The storage cells 103 supply power to the fans 151 and may be used as an emergency backup power for the RRH during power outages.

The solar body 150, in which an RRH is mounted, is situated on a lower end of the solar head 100 to protect the RRH from various surroundings. The solar body 150 is shaped in the form of a truncated circular cone with a flat top, and its side has a plurality of solar panels 153, which are openable upward for easy maintenance of the RRH. While six solar panels 153 are shown in FIG. 2, any number of solar panels may be attached to the solar body 150. Outer surfaces of the solar panels 153 block solar energy from being transferred to the interior of the solar body 150 and convert the solar energy into electric energy, and inner surfaces thereof are made of heat insulators for blocking heat on the outer surfaces of the solar panels 153 from being transferred to the solar head 100 and the solar body 150.

A central part of the solar body 150 is bored in a cylindrical shape having the same diameter as that of the pole so that the solar body 150 may be installed on the pole. An upper end of the solar body 150 has an air outlet 159 formed to exhaust the air, and a lower end thereof has an air inlet 161 formed to receive air. A side of the solar body 150 is sloped to best collect the solar energy during the daytime on sunny days, and the air inlet 161 in a lower end thereof is formed to facilitate an inflow of the high-density cold air.

The solar body 150 has light and rigid supports 163, which are arranged in the air outlet 159 in its upper end and the air inlet 161 in its lower end at intervals of 60°. Two adjacent supports are arranged at an angle of 60° with respect to each other. Protection nets 155 and 157 are mounted between the supports 163 to prevent the intrusion of birds and other animals. The protection net 157 on the lower end of the solar body 150 is arranged to open downward to facilitate easy cleaning of the interior of the RRH protection structure. In addition, the solar body 150 includes three fans 151 on its upper end. The fans 151 exhaust the hot air in the solar body 150 through the air outlet 159 to help the cold air in its lower end flow in smoothly through the air inlet 161.

Figure 4:
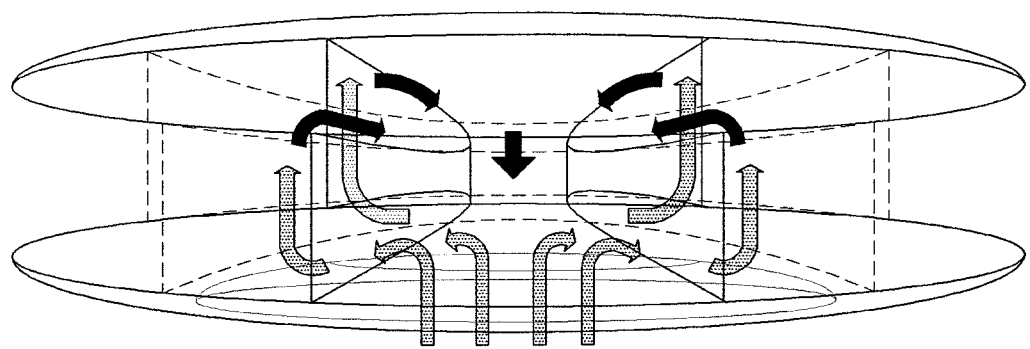
FIG. 4 is a diagram showing an operation of a wind cap of an RRH protection structure according to an exemplary embodiment of the present invention.

FIG. 4 is a diagram showing an operation of a wind cap of an RRH protection structure according to an exemplary embodiment of the present invention.

Referring to FIG. 4, the wind cap 190, which may be additionally provided to the RRH protection structure, is mounted on the top of the pole, on which the RRH protection structure is mounted. The wind cap 190 receives the heated air nearest the RRH and exhausts the air using an inner space of the sealed pole. The wind cap 190 is an eco-friendly air ejector constructed to apply Bernoulli's principle that uses the pressure difference caused by changes in velocity of the fluid as shown in FIG. 4, and may prevent an inflow of rainwater into the interior of the solar body 150 using the air outlet 159 in the upper end of the solar body 150.

In addition, a Light-Emitting Diode (LED) device or a lighting device may be mounted on the outside of the RRH protection structure. When installed in an urban area, the RRH protection structure may achieve lighting and advertising effects, providing stylish appearances.

Figure 3:
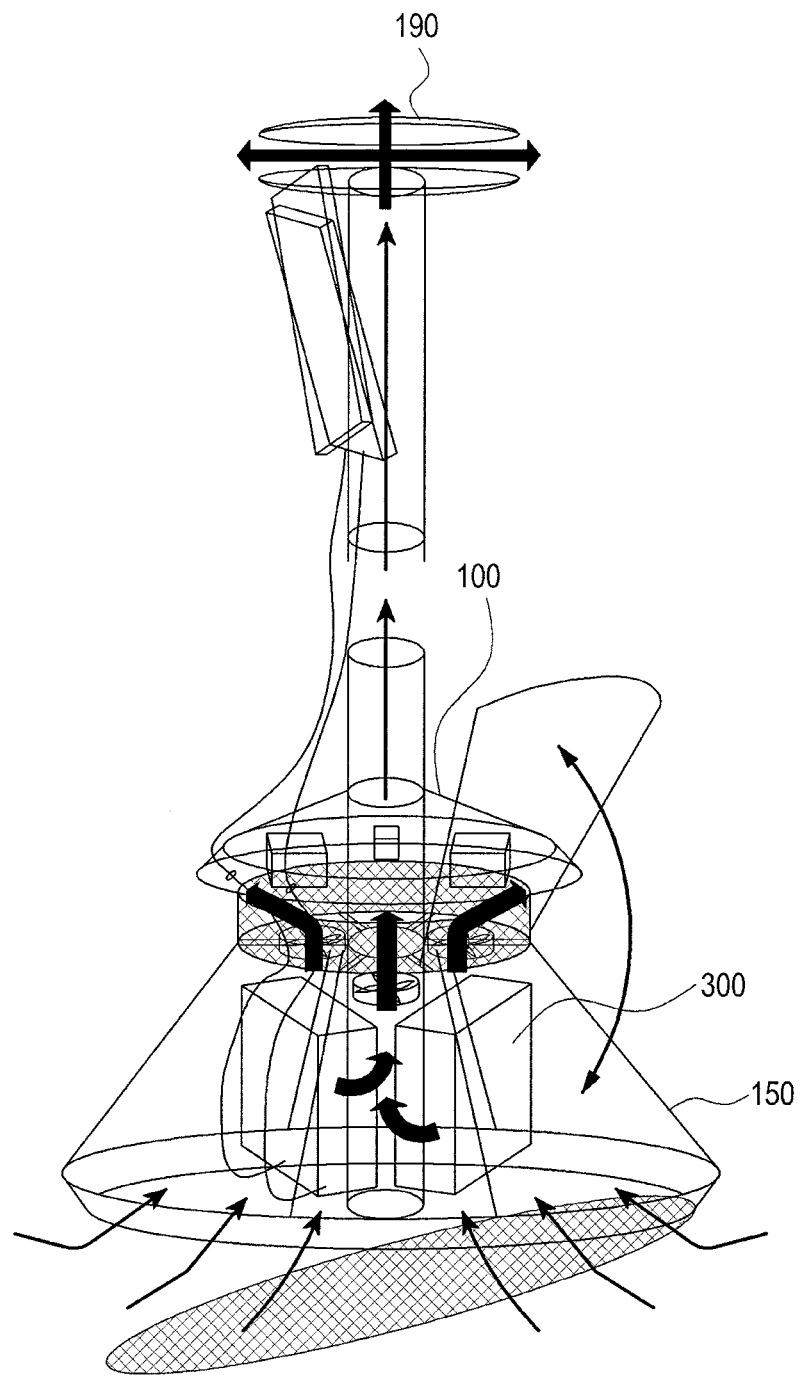
FIG. 3 is a diagram showing an operation of an RRH protection structure according to an exemplary embodiment of the present invention.

FIG. 3 shows an operation of an RRH protection structure according to an exemplary embodiment of the present invention.

Referring to FIG. 3, the RRH protection structure is mounted on a pole to protect an RRH 300. The RRH protection structure mounted on the pole converts solar energy into electric energy by means of the solar panels 101 and 153, and stores the electric energy in the storage cells 103 in the solar head 100. The RRH protection structure provides the electric energy stored in the battery cells 103 to the fans 151 on the upper end of the solar body 150. The electric energy may be used as emergency backup power for the RRHs 300 during a power outage.

In the RRH protection structure, each of the six solar panels 153 on the outer surface of the solar body 150 is coupled to a body of the solar body 150 at its upper end using a hinge or the like, and is moveable up/down around the hinge. Accordingly, each of the solar panels 153 is open when moving upward, facilitating easy maintenance of the RRHs 300. The use of the heat insulators on the inner surface of the solar body 150 prevents the solar heat from being transferred to the interior of the solar body 150. In addition, the RRH protection structure exhausts the hot air in the solar body 150 using the fans 151 mounted in the space between RRHs 300 on the upper end of the solar body 150, thereby allowing the cold air to flow in through the air inlet 161 on the lower end of the solar body 150. The protection net 157 on the lower end of the solar body 150 is openable downward, facilitating easy cleaning of the interior of the RRH protection structure. The RRH protection structure may receive the heated air nearest the RRHs 300 and exhaust the air to the outside, using the wind cap 190 additionally mountable on the top of the pole, and the exhausted air may be used as wind resources.

While the present invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A structure for protecting a Radio Frequency Remote Head (RRH) in a mobile communication system, the structure comprising:
   a solar head including an upper side sloped to prevent an inflow of rainwater and having at least one solar panel, and a lower side having at least one round cable hole surrounded by a rubber material; and
   a solar body situated on a lower end of the solar head and including a plurality of solar panels, a side of each of which is sloped to prevent an inflow of rainwater and is openable upward,
   wherein an upper end of the solar body has an air outlet formed to exhaust the air, a lower end thereof has an air inlet formed to receive the air,
   wherein each of the air outlet and the air inlet has a plurality of supports arranged at specific intervals and connected by a protection net.

2. The structure of claim 1, further comprising a wind cap mountable on a pole for receiving the heated air nearest the RRH and for exhausting the air via an inner space of the sealed pole,
   wherein the RRH protection structure is mountable on the pole.

3. The structure of claim 1, wherein the solar head comprises:
   at least one battery cell for storing electric energy provided from the plurality of solar panels; and
   a fan controller for adjusting a Revolutions Per Minute (RPM) of a plurality of fans in the solar body.

4. The structure of claim 1, wherein each of the solar head and the solar body has a shape of a truncated circular cone with a flat top.

5. The structure of claim 4, wherein the battery cell supplies power to the plurality of fans and supplies emergency backup power for the RRH during a power outage.

6. The structure of claim 1, wherein the solar body comprises a plurality of fans on the upper end thereof to circulate the internal air.

7. The structure of claim 1, wherein an outer surface of each of the plurality of solar panels blocks solar energy and converts the blocked solar energy into electric energy.

8. The structure of claim 1, wherein an inner surface of each of the plurality of solar panels comprises a heat insulator for blocking heat on each of the plurality of solar panels from being transferred to the solar head and the solar body.

9. The structure of claim 1, wherein the protection net on the lower end of the solar body is openable downward.

10. The structure of claim 1, wherein a Light-Emitting Diode (LED) device or a lighting device is mounted on the exterior of the structure.

11. The structure of claim 1, wherein the structure is mountable on a pole.

12. The structure of claim 11, wherein a central portion of the solar head comprises a cylindrical bore for mounting the solar head on the pole.

13. The structure of claim 11, wherein a central portion of the solar body comprises a cylindrical bore for mounting the solar body on the pole.

* * * * *